US010012892B2

(12) United States Patent
Harris (10) Patent No.: US 10,012,892 B2
(45) Date of Patent: Jul. 3, 2018

(54) FLEXIBLE BLEND FILTER FOR PROJECTORS

(71) Applicant: CHRISTIE DIGITAL SYSTEMS USA, INC., Cypress, CA (US)

(72) Inventor: Gordon Harris, Fergus (CA)

(73) Assignee: CHRISTIE DIGITAL SYSTEMS USA, INC., Cypress, CA (US)

(*) Notice: Subject to any disclaimer, the term of this patent is extended or adjusted under 35 U.S.C. 154(b) by 127 days.

(21) Appl. No.: 15/332,392

(22) Filed: Oct. 24, 2016

(65) Prior Publication Data

US 2018/0113379 A1    Apr. 26, 2018

(51) Int. Cl.
*G03B 21/14* (2006.01)
*G02B 27/09* (2006.01)
*H04N 9/31* (2006.01)

(52) U.S. Cl.
CPC ....... *G03B 21/142* (2013.01); *G02B 27/0927* (2013.01); *H04N 9/3185* (2013.01)

(58) Field of Classification Search
CPC .............................. G03B 21/14; G03B 21/26
See application file for complete search history.

(56) References Cited

U.S. PATENT DOCUMENTS

| 7,296,902 | B2 | 11/2007 | Gilbert et al. |
| 2007/0024826 | A1* | 2/2007 | Gilbert .................. G03B 21/26 353/122 |

FOREIGN PATENT DOCUMENTS

| EP | 1613071 A1 | 1/2006 |
| WO | 0219028 A1 | 3/2002 |

OTHER PUBLICATIONS https://www.christiedigital.com/SupportDocs/Anonymous/020-100122-01-Christie-MotoBlend-User-Manual.pdf; downloaded Aug. 31, 2016.
Jahan, Timothe, et al., "Multi Channel Systems, Next Generation Optical Blending", IMAGE 2016 Conference, Dayton, Ohio, Jun. 28-29, 2016.

* cited by examiner

Primary Examiner — Sultan Chowdhury
Assistant Examiner — Danell L Owens
(74) Attorney, Agent, or Firm — Perry + Currier Inc.

(57) ABSTRACT

A flexible blend filter for projectors is provided in a device comprising: a frame defining an open region; an elongated surface including a blending edge and an opposite edge; the elongated surface being flexible at least in a plane defined by the blending edge and the opposite edge; the elongated surface pivotably connected to the frame at one or more points; the blending edge spanning at least a portion of the open region; and, an actuator connected to the elongated surface, the actuator configured to move the elongated surface thereby flexing the blending edge in the plane.

19 Claims, 11 Drawing Sheets

FLEXIBLE BLEND FILTER FOR PROJECTORS

FIELD

The specification relates generally to projectors, and specifically to a flexible blend filter for projectors.

BACKGROUND

Many projectors have limited dynamic range and hence finite black levels. When two projectors are arranged to project overlapping images for example, when tiling images, a blend zone can appear brighter than the adjacent non-blend regions. Such an effect can be particularly noticeable when each projector is projecting a respective image, each having a finite black level. For example, if each projector has a given finite black level, in the blend zone the black level will be a sum of the given finite black levels of each projector (e.g. 2X fL intensity, or twice the black level of the projectors, assuming each projector has the same given finite black level of "X"), which can result in the blend zone appearing gray.

One solution is to move fixed geometry neutral density filter assemblies in and out of a light path frustum from a lens of a projector, to attempt to create a non-distracting optical blend for dark scenes, which can work for night simulators and other situations with dark scenes. However, such a solution does not tend to work well with projectors much higher than 8000 lumens without overheating and distorting the filters, unless they are quite large and far away from the lens, which can be awkward to arrange.

Another solution, referred to as electronic blending, is to boost the black level electronically outside the blend zones to a higher gray level; however, such a solution reduces dynamic range. Hence, while such a solution can be used for scenes without much black content, it is not versatile.

SUMMARY

Provided herein is a device that includes a flexible blend filter for projectors which includes an elongated surface including a blending edge and an opposite edge, the elongated surface being flexible at least in a plane defined by the blending edge and the opposite edge; the elongated surface pivotably connected to a frame at one or more points, and the blending edge spanning at least a portion of an open region of the frame. An actuator, such as a servo-motor, is connected to the elongated surface and can move it to flex the blending edge in the plane. The blending edge can be positioned at a side of a lens of a projector where a blend zone portion of an image is being in order projected to blend the image with another image being projected by another projector; indeed, both of the projectors can be equipped with such a blending edge. Furthermore, the actuator can be manually operated and/or configured to wirelessly communicate with a controller, with the actuator receiving commands for flexing the blending edge; from the controller; the flexible blend filter can hence be remote-controlled.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The present specification provides a device comprising: a frame defining an open region; an elongated surface including a blending edge and an opposite edge; the elongated surface being flexible at least in a plane defined by the blending edge and the opposite edge; the elongated surface pivotably connected to the frame at one or more points; the blending edge spanning at least a portion of the open region; and, an actuator connected to the elongated surface, the actuator configured to move the elongated surface thereby flexing the blending edge in the plane.

The elongated surface can be pivotably connected to the frame at two points, and the actuator can be connected to the opposite edge of the elongated surface between the two points, and the actuator can be configured to move the elongated surface via the opposite edge, thereby flexing the blending edge in the plane between the two points. Positions of the two points, and a connection of the actuator to the opposite edge can be selected to cause the blending edge to flex into a catenary when the actuator moves the elongated surface via the opposite edge. The two points can be located at opposite ends of the blending edge, and a connection of the actuator to the opposite edge can be about midway between the two points. The actuator can be configured to flex the blending edge in the plane by moving the opposite edge in a direction away from the blending edge. The actuator can be configured to flex the blending edge in the plane moving the opposite edge in a direction towards the blending edge.

The blending edge can be one of straight or curved.

The elongated surface can be pivotably connected to the frame at one point at a first end of the elongated surface, and slidably connected to the frame at a second point at an opposite end of the elongated surface, and the actuator can be configured to slide the elongated surface relative to the second point to flex the blending edge in the plane.

The frame can be configured for attachment to a projector such that a projection lens of the projector projects light through the open region, and the blending edge can be located at an edge of the projection lens.

The blending edge can comprise one or more of a sawtooth filter and a blending filter configured to blend an edge of a first projected image with one or more corresponding edges of one or more second projected images.

The frame can be configured to confine the elongated surface in the plane defined by the blending edge and the opposite edge.

The elongated surface can comprise one or more of a flexible high temperature plastic and a metal.

The elongated surface can comprise a heat-resistant metal and dimensions of the heat-resistant metal of the elongated surface can be selected to render the heat-resistant metal flexible.

The elongated surface can comprise a plurality of slots extending from the opposite edge towards the blending edge, and dimensions and positions of the slots can be selected to render the elongated surface flexible.

The elongated surface can comprise a plurality of T-shaped slots extending from the opposite edge towards the blending edge, dimensions and positions of the slots can be selected to render the elongated surface flexible, respective tops of each of the plurality of T-shaped slots being about parallel with the blending edge.

The actuator can comprise one or more of a servo-motor, a screw mechanism, a lever, a cam, and a knob.

The actuator can be configured to receive commands to control the actuator to move the elongated surface.

The device can further comprise a wireless communication interface configured to receive commands from a controller to cause the actuator to move the elongated surface.

The device can further comprise a wireless communication interface configured to receive commands from a controller to cause the actuator to move the elongated surface, the commands based on image data acquired by a camera.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
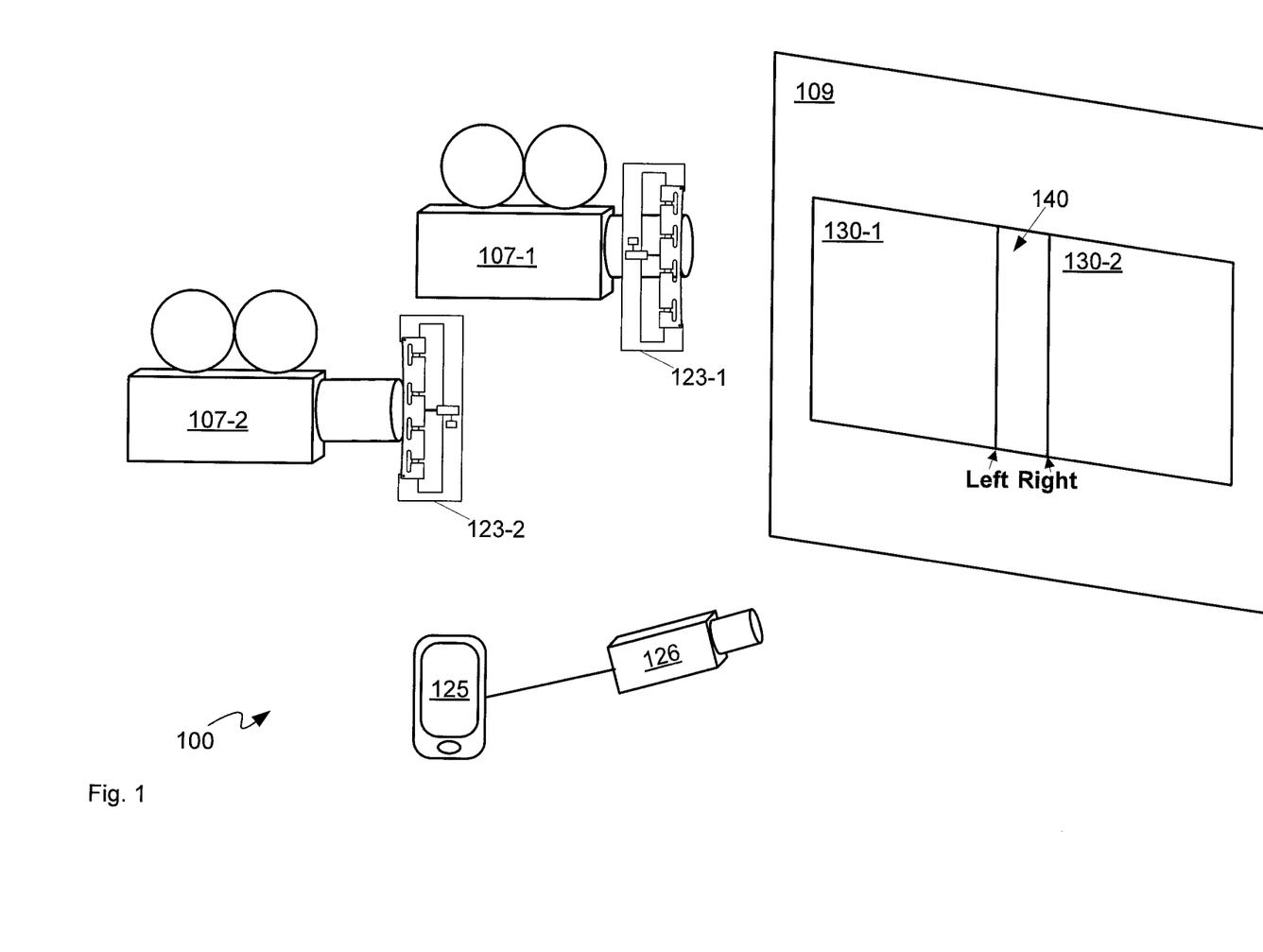
FIG. 1 depicts a system that includes two projectors and respective flexible blend filter devices, according to non-limiting implementations.

Attention is directed to FIG. 1 which depicts a system 100 for projecting blended images, system 100 comprising two or more projectors 107-1, 107-2 (interchangeably referred to hereafter, collectively, as projectors 107 and generically as a projector 107), a screen 109 upon which images from projectors 107 are projected, and flexible blending devices 123-1, 123-2, (interchangeably referred to hereafter, collectively, as devices 123 and generically as a device 123), one device 123 for each projector, in a one-to-one relationship. As depicted, system 100 further comprises an optional controller 125 which can be used to control and/or wirelessly drive each device 123, as described in detail below. As depicted, system 100 further comprises at least one optional camera 126, in communication with controller 125, which is positioned to acquire image data of screen 109, and images projected thereupon.

While not depicted, system 100 can further comprise at least one computing device, at least one projector controller, and/or at least one image generator, and the like, for controlling projectors 107. While also not depicted system 100 can further comprise an alignment system, a warping engine, and the like; such components can be used to warp and/or align video streams and/or images for projection onto screen 109. Furthermore, while present implementations are described with respect to projecting images onto a flat screen 109, in other implementations images and/or video streams can be projected onto other objects, including, but not limited to three-dimensional objects, for example in projection mapping applications. Hence, while screen 109 is depicted as flat, in other implementations, screen 109 can be curved, uneven, and the like; for example, screen 109 can comprise a portion of a sphere, and/or an object onto which tiled projection mapping is to occur.

Furthermore, while system 100 includes two projectors 107, other implementations can include more than two projectors 107, each projector 107 that contributes to overlapping images and/or tiled images equipped with a respective device 123. Each projector 107 can comprise a projector configured to project images, including but not limited to an analog projector, an analog film projector, a digital projector, a cinema projector, an LCOS (Liquid Crystal on Silicon) based projector, a DMD (digital multimirror device) based projector and the like.

As will also be described below, a blending edge of each device 123 is arranged at an edge of a lens of each respective projector 107 to blend a respective edge of a respective projected image with one or more corresponding edges of one or more second projected images.

For example, as also depicted in FIG. 1, a first projector 107-1 is arranged to project an image 130-1 onto screen 109, and a second projector 107-2 is arranged to project an image 130-2 onto screen 109. Images 130-1, 130-2 will be interchangeably referred to hereafter, collectively, as images 130 and generically as an image 130. Images 130 generally overlap in a blend zone 140. Images 130 can be images of respective video streams projected onto screen 109.

For reference, a "Left" and "Right" side of blend zone 140 is also indicated in FIG. 1, though such directions are understood to be present for reference only, and present implementations are not limited to blending left to right, or vice versa, across a blend zone; indeed, neither are present implementations limited to one blend zone. Indeed, a number of blend zones, and one or more directions of blending for each blend zone, can depend on an arrangement of projectors 107, a number of projectors 107, and the like.

However, as depicted, image 130-1 is on a left side of screen 109, and image 130-2 is on a right side of screen 109.

Images 130 can comprise tiled images and/or images with overlapping content in blend zone 140 (the overlapping content can be similar or different from each other), and each projector 107 hence contributes brightness to blend zone 140. For example, if a brightness of each image 130 is 1 fL (foot-Lambert), then a brightness in blend zone 140 (assuming devices 123 are absent in system 100) is 2 fL. Hence, without devices 123, the brightness in blend zone 140 can be higher than in regions of images 130 adjacent blend zone 140, which can cause discontinuities in brightness in tiled images 130.

To address this issue, device 123 can be used to blend images 130 in blend zone 140. For example, attention is directed to FIG. 2, which depicts a blend curve 190-1, representing an ideal blend filter transmission (in percent, on the ordinate or y-axis) across blend zone 140 for device 123-1, and a blend curve 190-2, representing an ideal blend filter transmission (in percent, on the ordinate or y-axis) across blend zone 140 for device 123-2. Curves 190-1, 190-2 are interchangeably referred to hereafter, collectively, as curves 190 and generically as a curve 190. Furthermore, it is appreciated that curves 190 are defined with respect to light being transmitted through a lens, and that curves 190 can be affected by pixels of images in the light, as described in further detail below; in other words, curves 190 do not strictly define transmission of any light "through" a blending edge of a blend filter, but rather define the effect of a blending edge of light interacting with the blending edge.

Figure 2:
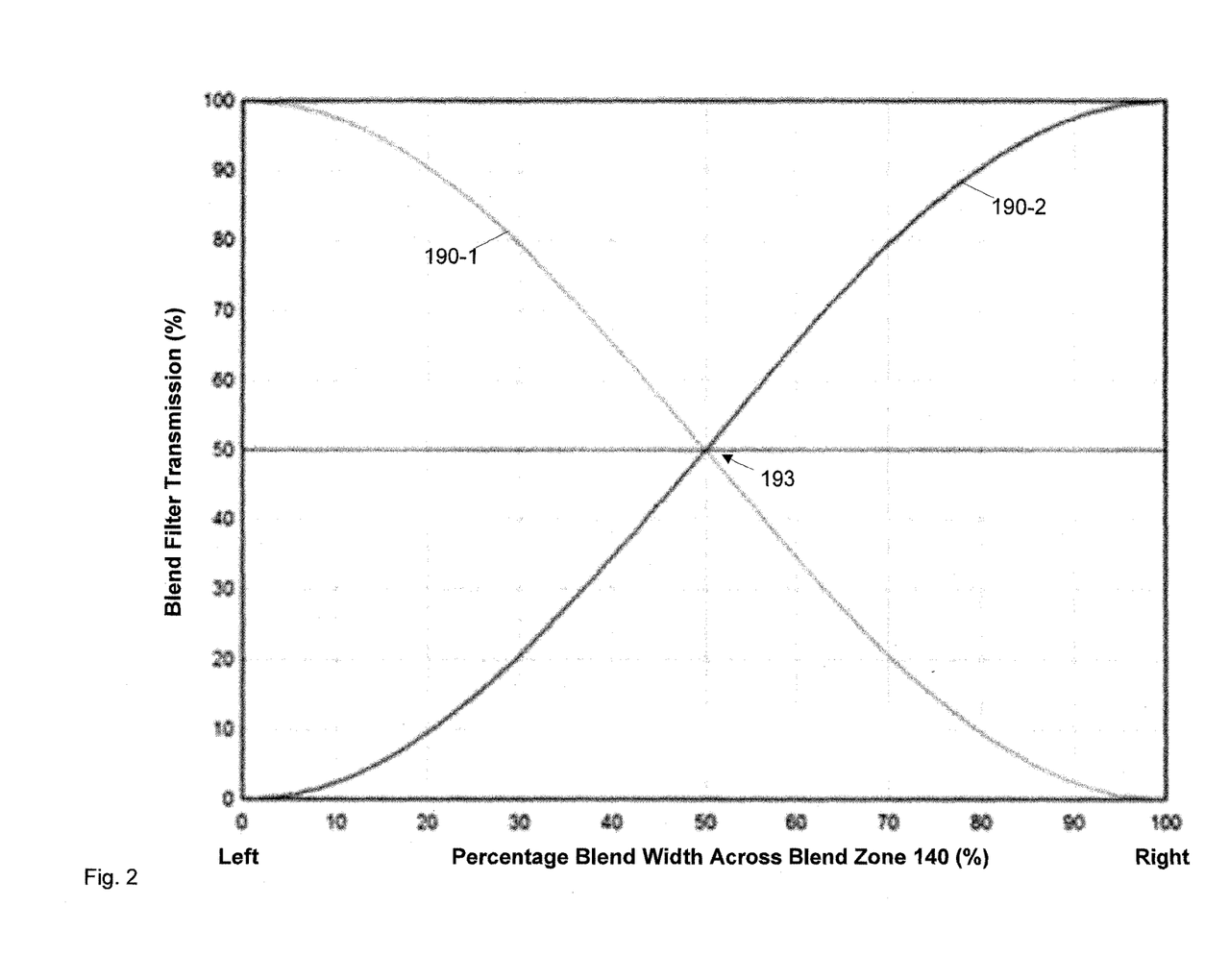
FIG. 2. depicts ideal blend filter blending curves for the flexible blend filter devices of FIG. 1, according to non-limiting implementations.

A distance across blend zone 140, on the abscissa or x-axis, is provided in terms of a percentage blend width across blend zone 140, the term "blend width" merely referring to a normalized position across blend zone 140, with a left side of blend zone 140 being at "0%" blend width, and a right side of blend zone 140 being at "100%" blend width.

Hence, from left to right, across blend zone 140, curve 190-1 ideally drops from 100% transmission to 0% transmission, as a cosine curve, as curve 190-2 ideally rises from 0% transmission to 100% transmission, also as a cosine curve. Hence, ideally, each of curves 190 are complementary to one another such that at any given point in blend zone 140, a sum of the transmission of curves 190-1, 201-2 is 100%; for example, at a point 193 where curves 190 intersect, each curve 190 is at 50% transmission, with point 193 located at a center of blend zone 140 (e.g. at 50% blend width).

However, achieving such ideal blend curves can be challenging. Hence, attention is next directed to FIG. 3, which depicts details of a device 123 located at an edge of a lens 200 of a projector (e.g. one of projectors 107). Device 123 comprises: a frame 201 defining an open region 202; an elongated surface 203 including a blending edge 205 and an opposite edge 207; elongated surface 203 being flexible at least in a plane defined by blending edge 205 and opposite edge 207; elongated surface 203 pivotably connected to frame 201 at one or more points 209; blending edge 205 spanning at least a portion of open region 202; and, an actuator 211 connected to elongated surface 203, actuator 211 configured to move elongated surface 203 thereby flexing blending edge 205 in the plane, as will be described in more detail below.

Figure 3:
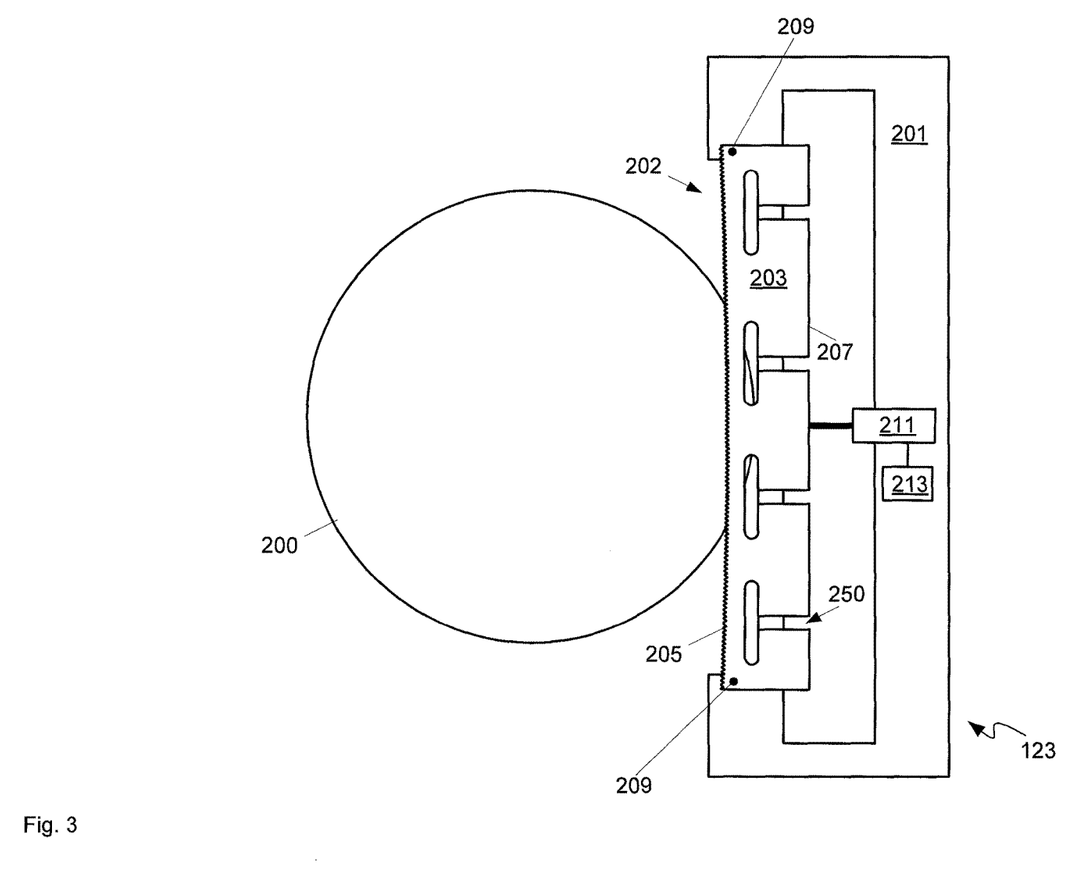
FIG. 3 depicts a perspective view of a flexible blend filter device in use with a lens of a projector, according to non-limiting implementations.

As depicted, device 123 further comprises a wireless communication interface 213 configured to receive commands from a controller, such as controller 125, to cause actuator 211 to move elongated surface 203 to flex blending edge 205. In some implementations, such commands can be based on image data acquired by a camera, such as camera 126, which can measure brightness across images 130, including blending zone 140; for example, controller 125 can receive image data acquired by camera 126 and in turn transmit commands to wireless communication interface 213 to cause actuator 211 (e.g. at one or more of devices 123-1, 123-2) to move, in a feedback loop, until a brightness of blending zone 140 is similar to a brightness of adjacent portions of images 130.

However, in other implementations, controller 125 can be manually operated to transmit commands to wireless communication interface 213 to cause actuator 211 to move elongated surface 203 to flex blending edge 205; hence a technician can view images 130, including blending zone 140 and adjust a brightness of blending zone 140 accordingly by controlling each of devices 123-1, 123-2.

Hence, controller 125 can comprise a portable or non-portable electronic device (e.g. a mobile smart phone, a laptop, a personal computer and the like) configured with an application which can transmit commands to control devices 123-1, 123-2 either manually or in a feedback loop.

While wireless communication interface 213 is depicted as separate from actuator 211, in other implementations, actuator 211 can comprise wireless communication interface 213; either way, actuator 211 can be generally configured to receive commands to control actuator 211 to move the elongated surface 203, as will be described hereafter. Wireless communication interface 213 can comprise one or more of a WiFi interface, a Bluetooth™ interface, and the like, or any other type of wireless communication interface compatible with receiving commands from controller 125, which is accordingly configured to communicate with wireless communication interface 213 using the same protocol. Alternatively, actuator 211 and controller 125 can be in wired communication; in such implementations device 123 does not include wireless communication interface 213, but a wired communication interface; however, in yet further implementations actuator 211 and controller 125 can be configured to communicate wirelessly and/or in a wired manner.

In yet further alternative implementations, actuator 211 can be manually operated, for example without the use of a controller.

Actuator 211 can comprise one or more of a servo-motor, a screw mechanism, a lever, a cam, and a knob. For example, as depicted, actuator 211 comprises a servo-motor with a shaft connected to opposite edge 207, and servo-motor can move the shaft (e.g. under manual operation, wireless operation and/or wired operation) towards, or away from, blending edge 205 to flex elongated surface 203 and in turn flex blending edge 205.

Figure 5:
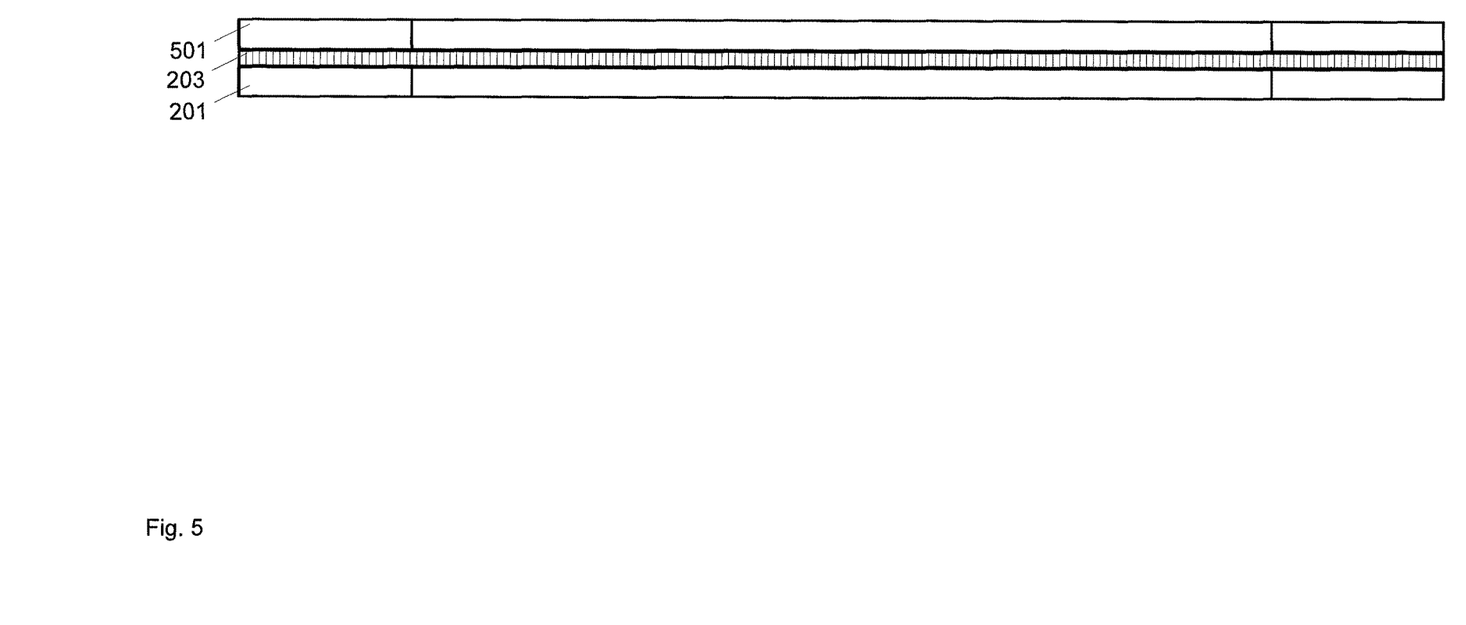
FIG. 5 depicts a blending edge side view of a flexible blend filter device that includes a dual frame that sandwiches an elongated surface, according to non-limiting implementations.

Specifically, as depicted, elongated surface 203 is pivotably connected to frame 201 at two points 209 at opposite ends of blending edge 205, and actuator 211 is connected to opposite edge 207 of elongated surface 203 between two points 209, actuator 211 configured to move elongated surface 203 via opposite edge 207, thereby flexing blending edge 205 in the plane between two points 209, as described below with reference to FIG. 5 and FIG. 6. For example, two points 209 are located at opposite ends of blending edge 205, and a connection of actuator 211 to opposite edge 207 is about midway between two points 209. A connection of actuator 211 to opposite edge 207 can be implemented using any suitable connecting device including, but not limited to, pins, screws, fasteners, epoxies, pin and slot mechanisms and the like. It is yet further understood that actuator 211 can move opposite edge 207 in a direction about perpendicular to opposite edge 207, and in the plane defined by blending edge 205 and opposite edge 207.

However other positions of points 209 and connection of actuator 211 to opposite edge 207 are within the scope of present implementations. For example, positions of two points 209, and a connection of actuator 211 to opposite edge 207 can be selected to cause blending edge 205 to flex into a catenary and/or maintain a catenary curvature when actuator 211 moves elongated surface 203 via opposite edge 207.

As depicted, blending edge 205 comprises one or more of a sawtooth filter and a blending filter configured to blend an edge of a first projected image with one or more corresponding edges of one or more second projected images. For example, properties of such a saw tooth filter (including, but not limited to, a pitch, a length and a tapers) can be selected to achieve, and/or approach, the blend curves 190 of FIG. 2, in conjunction with adjusting a flex of blending edge 205. However, while a sawtooth filter is depicted, other types of blending filters can be used, and further such sawtooth filters and/or blending filters can be adapted according to a pixel size of images 130.

At least blending edge 205 is of a length that extends at least across a portion of lens 200 that projects a portion of image corresponding to blend zone 140. While, as depicted, blending edge 205 extends past such a portion of lens 200, in other implementations, regions of blending edge 205 outside of such a portion of lens 200 can have a profile different from the profile within the portion of lens 200.

Furthermore, while as depicted blending edge 205 is curved, in other implementations, described below, blending edge 205 can be straight. In particular, in an initial rest position (e.g. prior to being flexed) blending edge 205 can comprise a catenary that is concave relative, for example, to opposite edge 207. While as depicted opposite edge 207 is straight, in other implementations opposite edge 207 can be curved.

To assist with flexing blending edge 205 in the plane, as depicted, elongated surface 203 can comprises a plurality of slots 250 (with one slot 250 being indicated in FIG. 4 for clarity) extending from opposite edge 207 towards blending edge 205, dimensions, numbers and positions of slots 250 being selected to render elongated surface 203 flexible. While four slots 250 are depicted, elongated surface 203 can comprise fewer than four or more than four slots 250.

Figure 4:
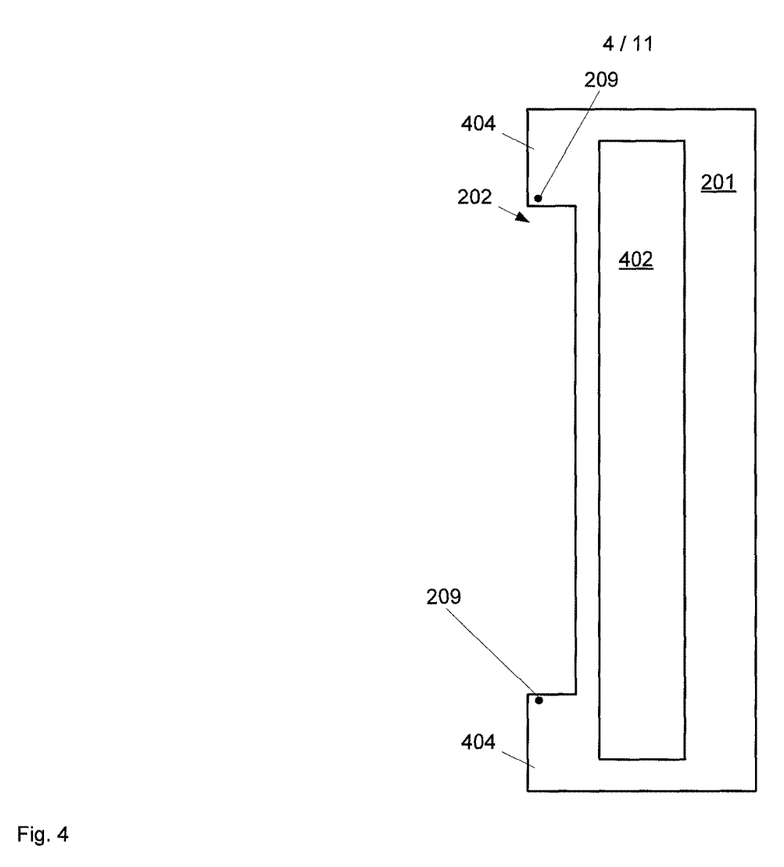
FIG. 4 depicts a frame of a flexible blend filter device, according to non-limiting implementations.

As depicted, each slot 250 is T-shaped such that elongated surface 203 comprises a plurality of T-shaped slots extending from opposite edge 207 towards blending edge 205, dimensions and positions of slots 250 being selected to render elongated surface 203 flexible, respective tops of each of the plurality of T-shaped slots being about parallel with blending edge 205. Such a structure can enable blending edge 205 to flex along the respective tops of each of the plurality of T-shaped slots, and the remainder of the T-shaped slots can enable the portions of elongated surface 203 to expand away from each other and/or compress towards each other. However, other types of slots are within the scope of present implementations.

As lens 200, and/or a region in front of lens 200 where device 123 is located, can get hot, especially when projectors 107 are projecting above 8000 fL, elongated surface 203 can comprise one or more of a flexible high temperature plastic and a metal. In particular, elongated surface 203 can comprise a heat-resistant metal and dimensions of the heat-resistant metal of elongated surface 203 can be selected to render the heat-resistant metal flexible. In other words, a thickness of the heat resistant metal is selected such that elongated surface 203 can flex in a plane.

Furthermore, elongated surface 203 is generally flat, for example in a plane defined by both blending edge 205 and opposite edge 207.

Attention is next directed to FIG. 4, which depicts a non-limiting example of frame 201, without other components of device 123. Frame 201 is generally also made from heat resistant material, such as a metal, but is stiff as compared to elongated surface 203. Furthermore, frame 201 is configured for attachment to a projector 107 such that a projection lens 200 of projector 107 projects light through open region 202, and (with reference to FIG. 4), blending edge 205 is located at an edge of projection lens 200, for example, an edge through which a portion of an image corresponding to blend zone 140 is projected. Hence, while not depicted, frame 201 can further comprise attachment apparatus configured to attach frame 201 and device 123 to a projector 107 to position blending edge 205 at an edge of lens 200.

While as depicted frame 201 comprise an aperture 402 there through, aperture 402 can be optional, but can be provided to assist with heat dissipation at frame 201.

As depicted, open region 202 is defined by two arms 404 extending from a remaining portion of frame 201, pivot points 209 be located at arms 404, one pivot point 209 at each arm 404. Arms 404 can be separated by a distance that is at least as large as a portion of lens 200 where blending edge 205 is located; and further can extend a distance from the remaining portion of frame 201 that positions blending edge 205 at the edge of lens 200 through which a portion of an image corresponding to blend zone 140 is projected.

Each of pivot points 209 can comprise a pin extending from frame 201 through which a corresponding aperture of elongated surface 203 pivotably extends, or vice versa. Alternatively, each of pivot points 209 can comprise an aperture through each of frame 201 and elongated surface 203, with a pin, and the like, extending through each aperture. However, other types of pivot mechanisms are within the scope of present implementations.

While not depicted, frame 201 can further comprise attachment devices for each of actuator 211 and wireless communication interface 213, when present.

Frame 201 is further generally configured to confine elongated surface 203 in the plane defined by blending edge 205 and opposite edge 207. Hence, a surface of frame 201 that contacts elongated surface 203 is generally flat, as elongated surface 203 is flat. To assist with confining elongated surface 203 in a plane, and with reference to FIG. 5, in some implementations device 123 can comprise a second frame 501 located on a side of elongated surface 203 opposite frame 201. In particular, FIG. 5 depicts a blending edge side view of implementations that include elongated surface 203 sandwiched between frame 201 and a second frame 501, each of elongated surface 203, and corresponding surfaces of frames 201, 501 being flat. Such a sandwich construction can be more effective at assisting with confining elongated surface 203 to a plane when flexing.

In particular, such confinement can alternatively be referred to as preventing elongated surface 203 from buckling in a direction perpendicular to a normal of the plane defined by blending edge 205 and opposite edge 207.

Indeed, it is further appreciated that slots 250 assist with prevention of buckling; for example, such slots 250 can assist with flexing in the absence of second frame 501, as will now be described with reference to FIG. 6 and FIG. 7, which depicts device 123 in operation in front of lens 200. Indeed, each of FIG. 6 and FIG. 7 are substantially similar to FIG. 3, with like elements having like numbers.

Figure 6:
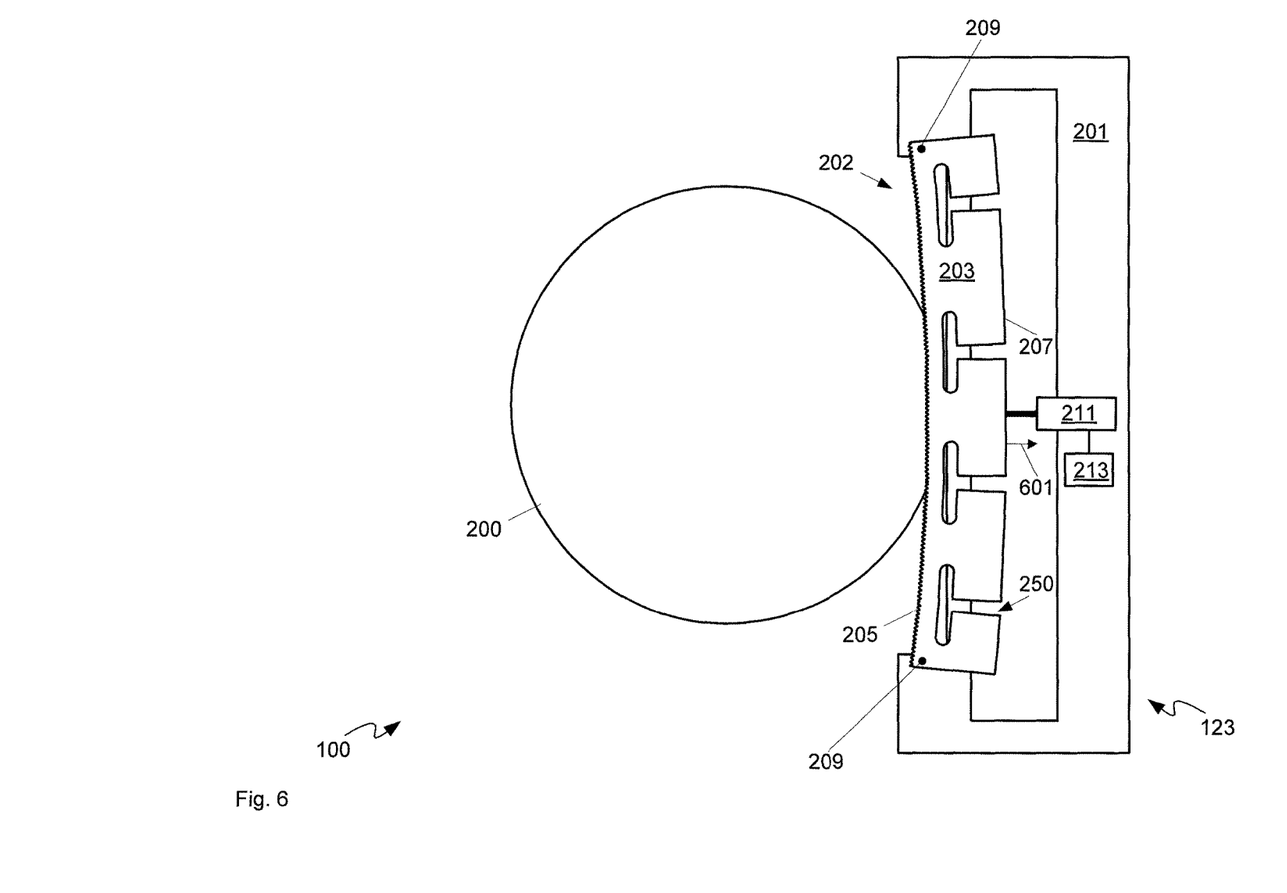
FIG. 6 depicts the flexible blend filter device of FIG. 3 when an actuator increases a curvature of a blending edge, according to non-limiting implementations.
Figure 7:
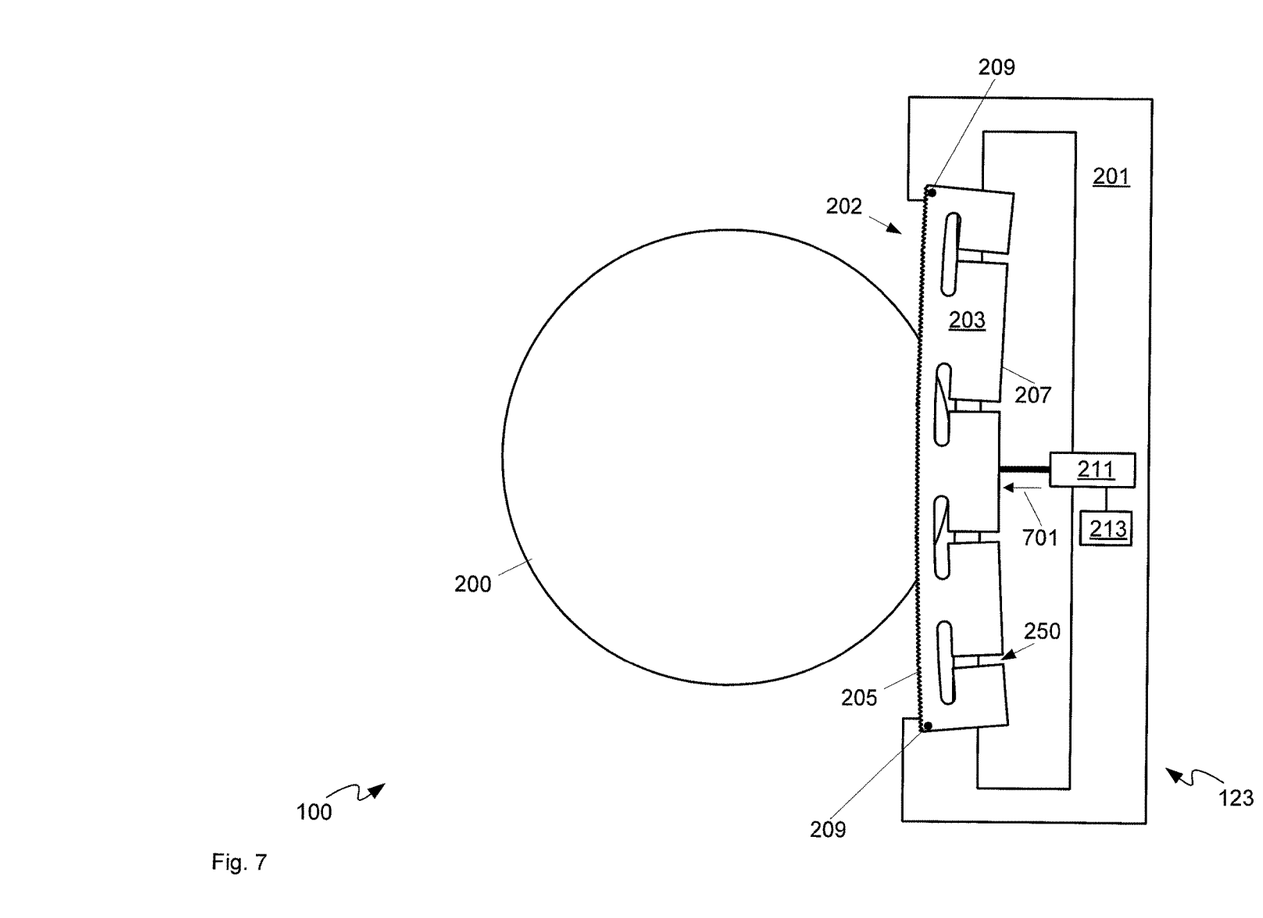
FIG. 7 depicts the flexible blend filter device of FIG. 3 when an actuator decreases a curvature of a blending edge, according to non-limiting implementations.

In particular, in FIG. 6, actuator 211 is depicted as flexing blending edge 205 in the plane by moving opposite edge 207 in a direction away from the blending edge 205, as represented by arrow 601, and in the plane; for example, actuator 211 can receive a command from controller 125 via wireless communication interface 213, which causes actuator 211 to shorten the shaft connected to opposite edge 207, which in turn pulls a center portion of opposite edge 207 towards actuator 211, and away from blending edge 205. Alternatively, actuator 211 can be manually operated.

As elongated surface 203, and blending edge 205, are pivotably attached to frame at pivot points 209, such a movement causes elongated surface 203, and blending edge 205, to pivot at pivot points 209, and slots 250 to widen and/or expand at opposite edge 207, which in turn causes a curve of blending edge 205 to increase (or, if blending edge 205 is straight, applies a curvature to blending edge 205).

Such increase in curvature of blending edge 205 changes a physical position of blending edge 205 with respect to lens 200, in the plane, and hence in turn changes a blend curve of blending edge 205 with respect to light transmitted through lens 200. Specifically, the actual transmission of light through blending edge 205 is determined largely by optical effects of blending edge 205 and lens 200; hence, changing a curvature and/or position of blending edge 205 causes blurring and/or obscuring of pixel edges at images projected through lens 200 that correspond to blend zone 140, at least in a plane of screen 109, and slight adjustments in curvature and/or position of blending edge 205 that can reduce visible banding in blend zone 140 with respect to a remainder of images 130. Put another way, and assuming that light projected from lens 200 is generally in the shape of a cone, a change in curvature and/or position of blending edge 205 changes a physical position and/or physical configuration of blending edge 205 with respect to lens 200, which in turn changes a light frustum edge position of images projected there through; such a description assumes that blending edge 205 shapes the cone of light into a frustum, and physical position and/or physical configuration of blending edge 205 shapes the edge of the frustum.

Similarly, in FIG. 7, actuator 211 is depicted as flexing blending edge 205 in the plane by moving opposite edge 207 in a direction towards from the blending edge 205 in the plane, as represented by arrow 701; for example, actuator 211 can receive a command from controller 125 via wireless communication interface 213, which causes actuator 211 to lengthen the shaft connected to opposite edge 207, which in turn pushes a center portion of opposite edge 207 away from actuator 211, and towards blending edge 205. Alternatively, actuator 211 can be manually operated.

As elongated surface 203, and blending edge 205, are pivotably attached to frame at pivot points 209, such a movement causes elongated surface 203, and blending edge 205, to pivot at pivot points 209, and slots 250 to narrow and/or compress at opposite edge 207, which in turn causes a curve of blending edge 205 to decrease (or, if blending edge 205 is straight, applies a curvature to blending edge 205) or as depicted, the curvature can change from concave to convex, though such a change is understood to be extreme and is provided for illustration purposes only; in practise, it can be goal to maintain the convex catenary curvature of blending edge 205.

Regardless, such a change curvature of blending edge 205 changes a physical position of blending edge 205 with respect to lens 200, and hence in turn changes the light frustum edge position of light transmitted through lens 200.

Hence, controller 125 can be used to adjust both devices 123-1, 123-2, as described above, until an acceptable brightness in blend zone 140 is achieved. Such an acceptable brightness can be determined visually and/or using camera 126 (e.g. in the above described feedback loop).

Persons skilled in the art will appreciate that there are yet more alternative implementations and modifications possible. For example, elongated surfaces used herein can have configurations different from elongated surface 203. For example, attention is directed to FIG. 8 which depicts an elongated surface 803 that is similar to elongated surface 203, except that a blending edge 805 is flat; elongated surface 803 could be used in place of elongated surface 203 in device 123, with actuator 211 and/or a remainder of device 123, adapted to achieve a desired blending curve taking into account the different geometry of elongated surface 803.

Figure 8:
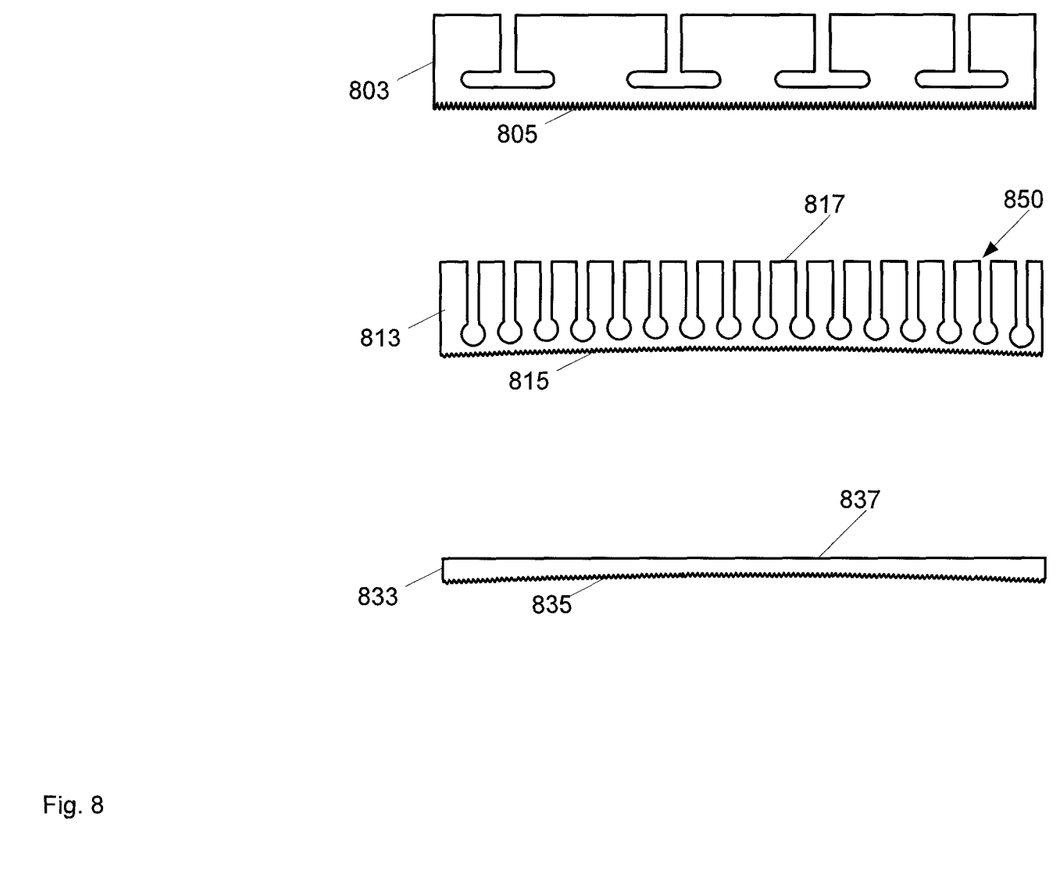
FIG. 8 depicts examples of other elongated surfaces that can be used with the flexible blend filter device of FIG. 3, according to non-limiting implementations.

FIG. 8 further depicts another elongated surface 813 that is similar to elongated surface 203, except that slots 850 in elongated surface 813 have a different configuration than slots 250. In particular, each slot 850 comprises a circular hole adjacent blending edge 815, with a rectangular slot extending from the circular hole to an opposite edge 817. A number of slots 850 can be greater than a number of T-shaped slots 250 to account for the reduced area of the circular holes as compared to tops of the T-shaped slots 250. In other words, flexibility of blending edge 815 (and/or blending edge 205) can increase as an area of portions of slots 850 (and/or slots 250) adjacent blending edge 815 (and/or blending edge 205) increases. Elongated surface 813 could be used in place of elongated surface 203 in device 123, with actuator 211 and/or a remainder of device 123, adapted to achieve a desired blending curve taking into account the different geometry of elongated surface 813.

FIG. 8 further depicts another elongated surface 833 that is similar to elongated surface 203, except elongated surface 833 is narrower than other elongated surfaces described herein and therefore is absent slots. In other words, a width between a blending edge 835 and an opposite edge 837 is selected, along with a thickness and material of elongated surface 833, that renders blending edge 835 flexible without compressing or expanding slots. Elongated surface 833 could be used in place of elongated surface 203 in device 123, with actuator 211 and/or a remainder of device 123, adapted to achieve a desired blending curve taking into account the different geometry of elongated surface 833.

Yet more alternative implementations and modifications are possible and within the scope of present implementations including other configurations for flexing a blending edge of an elongated surface. For example, attention is next directed to FIG. 9, which depicts a device 123a, positioned relative to lens 200, device 123a being is substantially similar to FIG. 3, with like elements having like numbers, however in a "900" series rather than a "200" series. However, device 123a uses a different mechanism for flexing a blending edge.

Figure 9:
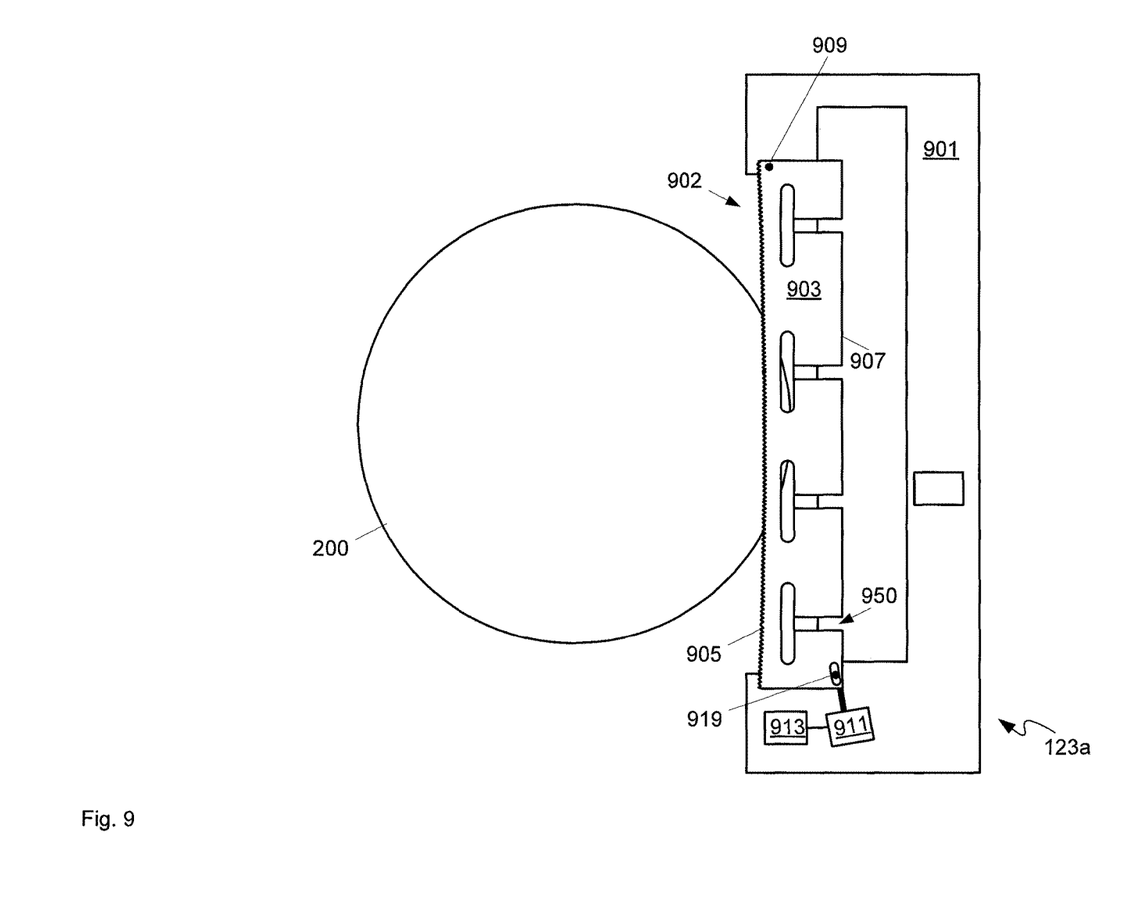
FIG. 9 depicts a perspective view of a flexible blend filter device in use with a lens of a projector, according to alternative non-limiting implementations.

In particular, device 123a includes: a frame 901 defining an open region 902; an elongated surface 903 including a blending edge 905 and an opposite edge 907; elongated surface 903 being flexible at least in a plane defined by blending edge 905 and opposite edge 907; elongated surface 903 pivotably connected to frame 901 at one or more points 909; blending edge 905 spanning at least a portion of open region 902; and, an actuator 911 connected to elongated surface 903, actuator 911 configured to move elongated surface 903 thereby flexing blending edge 905 in the plane. Device 123a further includes a wireless communication interface 913 and elongated surface 903 includes slots 950.

However, in contrast to device 123, elongated surface 903 is pivotably connected to frame 901 at one point at a first end of elongated surface 903 (and in particular an end of blending edge 905), and slidably connected to frame 901126 at a second point 919 (for example including, but not limited to using the depicted pin and slot mechanism) at an opposite end of elongated surface 903 (and in particular adjacent opposite edge 907), and actuator 911 is configured to slide elongated surface 903 relative to the second point to flex blending edge 905 in the plane.

Figure 10:
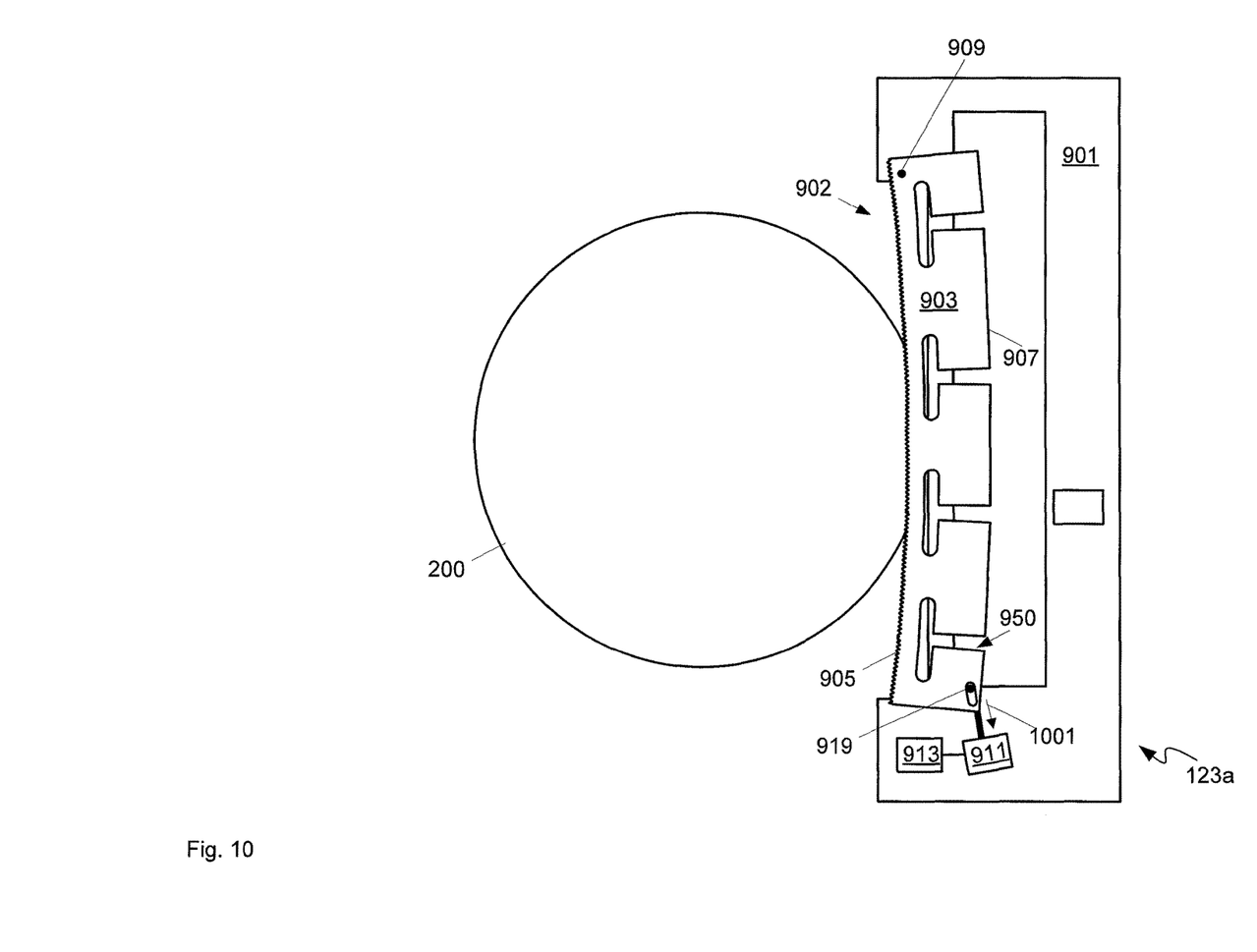
FIG. 10 depicts the flexible blend filter device of FIG. 9 when an actuator increases a curvature of a blending edge, according to non-limiting implementations.
Figure 11:
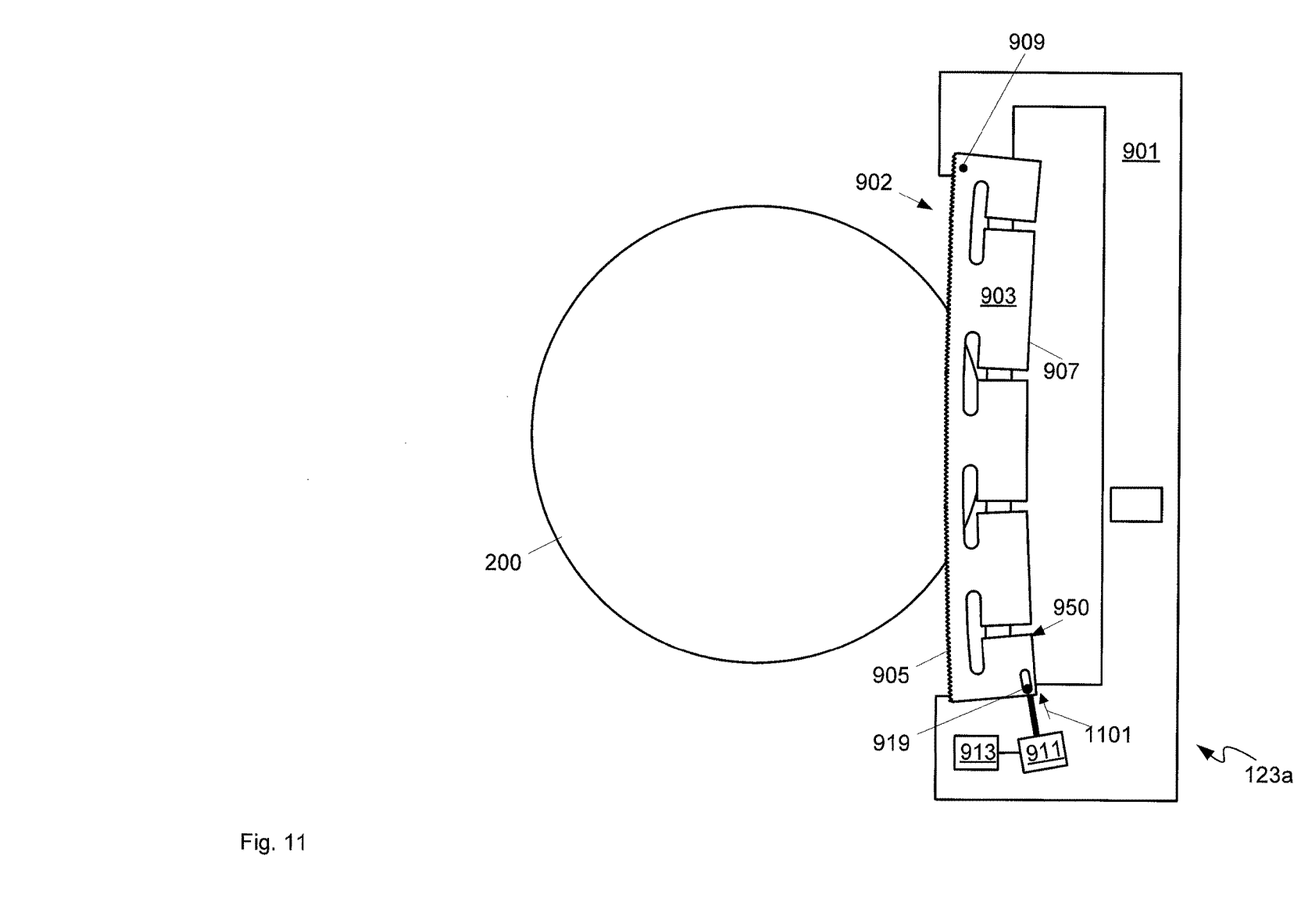
FIG. 11 depicts the flexible blend filter device of FIG. 9 when an actuator decreases a curvature of a blending edge, according to non-limiting implementations.

For example, as depicted, actuator 911 can pull a corner of opposite edge 907 in a direction away from point 909 to increase the curvature of blending edge 905, as depicted in FIG. 10, such pulling indicated by arrow 1001; and similarly, actuator 911 can push the corner of opposite edge 907 in a direction towards point 909 to decrease the curvature of blending edge 905, as depicted in FIG. 11, such pushing indicated by arrow 1101. In other words, the action of device 123*a* in FIG. 10 has a similar effect as the action of device 123 depicted in FIG. 6, and the action of device 123*a* in FIG. 11 has a similar effect as the action of device 123 depicted in FIG. 7. FIG. 10 and FIG. 11 are each otherwise substantially similar to FIG. 9.

Persons skilled in the art will appreciate that there are yet more alternative implementations and modifications possible. For example, after a suitable position of each device 123 (and/or device 123*a*) of system 100 is determined, each elongated surface 203 (and/or elongated surface 903) could be fixed in place, and actuators removed therefrom, and/or replaced with a non-flexible and/or rigid blend filter having a similar curvature to elongated surface 203 (and/or elongated surface 903) that achieves the desired blending.

In yet further implementations, and assuming that a lens of each of projectors 107 are substantially adjacent, devices 123-1, 123-2 could be combined in a single device with two elongated surfaces, one for each projector 107, on a common frame, with respective actuators.

Indeed, devices 123, 123*a* described herein could be used with any number of projectors of a projection tiling system and/or a projection mapping system to adjust any number of blend zones in any direction.

Furthermore, devices 123, 123*a* described herein could each further be mounted to a positioning device which can move devices 123, 123*a* relative to a lens of a projector in order to position a blending edge at a suitable edge of a lens of a projector, for example prior to flexing the blending edge.

In addition, devices 123, 123*a* described herein could be combined with other techniques for adjusting a blend area including, but not limited to, electronic blending. Furthermore, a transparency of elongated surfaces described herein could be adjustable and/or greater than 0% such that elongated surfaces described herein can also be used as neutral density filters and/or adjustable neutral density filters.

Hence, provided herein are devices for blending images from projectors that overlap with other images, and which can reduce brightness of blend zones as well as reduce discontinuities and/or banding. Indeed, a flexible blending edge is provided which can be positioned at an edge of a lens of a projector, and the blending edge can be flexed to change its curvature and hence its effect on blending images.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
    a frame defining an open region;
    an elongated surface including a blending edge and an opposite edge; the elongated surface being flexible at least in a plane defined by the blending edge and the opposite edge; the elongated surface pivotably connected to the frame at one or more points; the blending edge spanning at least a portion of the open region; and,
    an actuator connected to the elongated surface, the actuator configured to move the elongated surface thereby flexing the blending edge in the plane.

2. The device of claim 1, wherein the elongated surface is pivotably connected to the frame at two points, and the actuator is connected to the opposite edge of the elongated surface between the two points, the actuator configured to move the elongated surface via the opposite edge, thereby flexing the blending edge in the plane between the two points.

3. The device of claim 2, wherein positions of the two points, and a connection of the actuator to the opposite edge are selected to cause the blending edge to flex into a catenary when the actuator moves the elongated surface via the opposite edge.

4. The device of claim 2, wherein the two points are located at opposite ends of the blending edge, and a connection of the actuator to the opposite edge is about midway between the two points.

5. The device of claim 2, wherein the actuator is configured to flex the blending edge in the plane by moving the opposite edge in a direction away from the blending edge.

6. The device of claim 2, wherein the actuator is configured to flex the blending edge in the plane moving the opposite edge in a direction towards the blending edge.

7. The device of claim 1, wherein the blending edge is one of straight or curved.

8. The device of claim 1, wherein the elongated surface is pivotably connected to the frame at one point at a first end of the elongated surface, and slidably connected to the frame at a second point at an opposite end of the elongated surface, and the actuator is configured to slide the elongated surface relative to the second point to flex the blending edge in the plane.

9. The device of claim 1, wherein the frame is configured for attachment to a projector such that a projection lens of the projector projects light through the open region, and the blending edge is located at an edge of the projection lens.

10. The device of claim 1, wherein the blending edge comprises one or more of a sawtooth filter and a blending filter configured to blend an edge of a first projected image with one or more corresponding edges of one or more second projected images.

11. The device of claim 1, wherein the frame is configured to confine the elongated surface in the plane defined by the blending edge and the opposite edge.

12. The device of claim 1, wherein the elongated surface comprises one or more of a flexible high temperature plastic and a metal.

13. The device of claim 1, wherein the elongated surface comprises a heat-resistant metal and dimensions of the heat-resistant metal of the elongated surface are selected to render the heat-resistant metal flexible.

14. The device of claim 1, wherein the elongated surface comprises a plurality of slots extending from the opposite edge towards the blending edge, dimensions and positions of the slots being selected to render the elongated surface flexible.

15. The device of claim 1, wherein the elongated surface comprises a plurality of T-shaped slots extending from the opposite edge towards the blending edge, dimensions and positions of the slots being selected to render the elongated surface flexible, respective tops of each of the plurality of T-shaped slots being about parallel with the blending edge.

16. The device of claim 1, wherein the actuator comprises one or more of a servo-motor, a screw mechanism, a lever, a cam, and a knob.

17. The device of claim 1, wherein the actuator is configured to receive commands to control the actuator to move the elongated surface.

18. The device of claim 1, further comprising a wireless communication interface configured to receive commands from a controller to cause the actuator to move the elongated surface.

19. The device of claim 1, further comprising a wireless communication interface configured to receive commands from a controller to cause the actuator to move the elongated surface, the commands based on image data acquired by a camera.

* * * * *